Patented Sept. 27, 1932

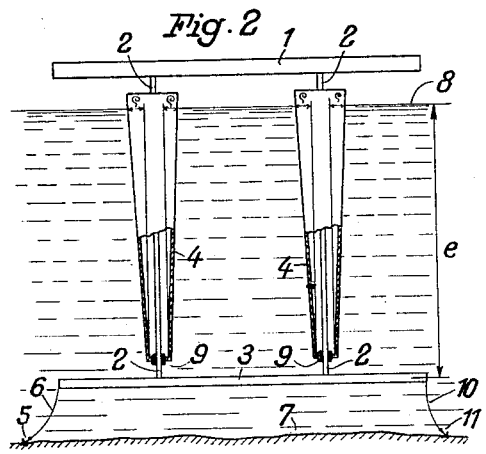
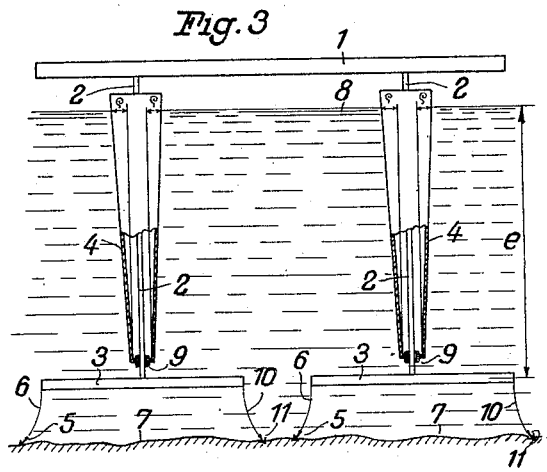
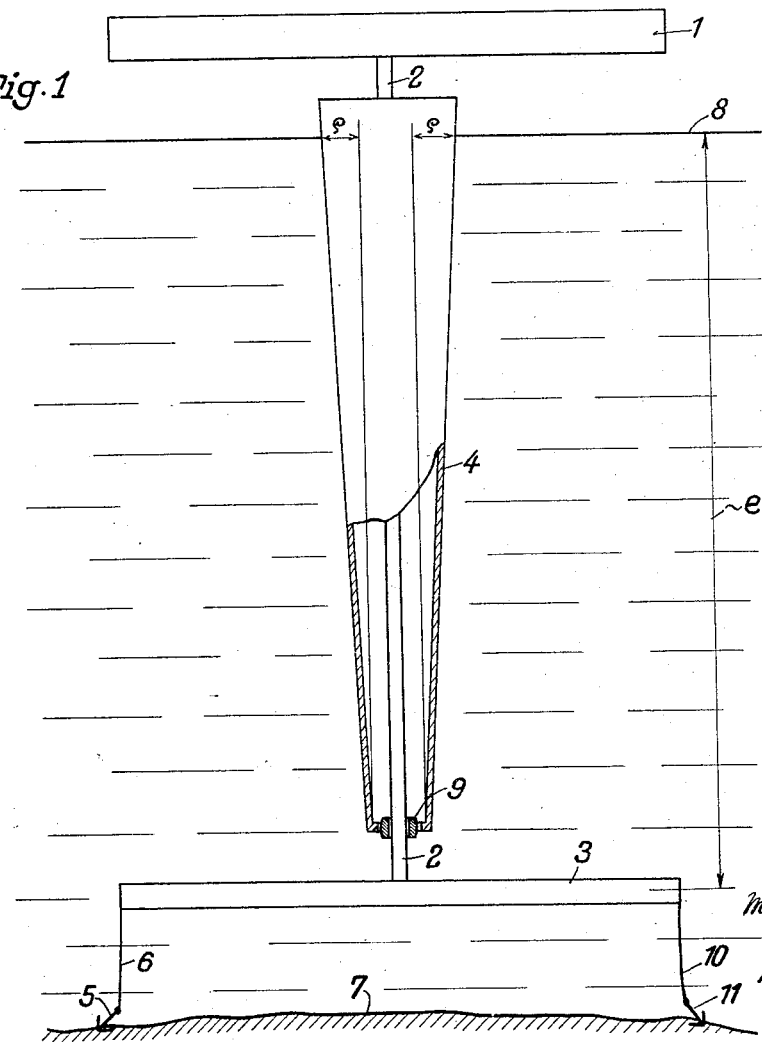

1,879,745

UNITED STATES PATENT OFFICE

MAX ALBERT HENKER, OF LUGAU, GERMANY

FLOATING SUPPORT

Application filed December 3, 1931, Serial No. 578,672, and in Germany December 12, 1930.

This invention relates to a floating support for open water, serving for example as a starting and landing place for aircraft, as a stand for notices, lights and the like, as a repeater station for telegraph and telephone cables and for any other purpose for which a steady support is required. An object of the invention is to provide such a floating support in which the effect of waves is reduced to the minimum possible. The invention is of particular use for water of considerable depth where the construction of foundations in the solid bed is difficult or impossible under present day technique.

Three examples embodying the invention are illustrated partly in section in the accompanying drawing, referred to hereinafter.

Figure 1 shows the simplest form of device,

Figure 2 shows a single float with two supporting structures, and

Figure 3 shows two floats each with a single structure leading to the actual support. Like parts bear the same reference numbers throughout the several views.

According to existing knowledge of the wave motion of open water, the maximum height and therefore the greatest diameter of the particle orbits in deep water, with wind waves is $\frac{1}{10}$ to 1/20 of the wave length.

Only wind waves need to be considered because as is known with free waves or swell which are, it is true, often of much greater length, the ratio of wave height to wave length is 1/30, 1/40 and less.

According to wave theory the length of a wave cannot be greater than the depth of the sea at its location; but at depths of over 1,000 metres wind or free waves of equal length have not been observed.

The maximum wave height is designated H hereinafter and the known equation $H=2\zeta$, $\zeta$ being the radius of the orbit path on the surface, is postulated.

According to Rankine's rule, the diameters of the orbits ($2\zeta$) fall off in geometric progression as the depth increases in arithmetical progression, the ratio of decrease being 2 for each increase in depth of 1/9 of a wave length.

This is illustrated by the following example: Let the height of a wave of 90 metres length be H=3 metres, when the diameter of the orbit at the surface ($2\zeta$) =3 m. At a depth of 1/9 of the wave length, that is at 10 m. below the surface of the water, $2\zeta$ is now a half the surface value, i. e. 1.5 m. At a depth of 2/9, that is at 20 m. below the surface of the water, $2\zeta$ is again half its previous value, that is 0.75 m. and so forth.

At a depth of 10/9, that is at 100 m. below the surface of the water, the value of $2\zeta$ is less than 0.003 m., that is practically zero.

From this it follows that with a wave length of 90 m. and a practical maximum wave height of 9 m., a body lying at a depth of about 100 meters makes a circular movement in the vertical plane of about 0.009 m. diameter, or according to Rankine's rule a circular movement with a radius of $\frac{H}{2048}$ about the mid point of its position of rest.

If for example, therefore a support in the form of a float is anchored a sufficient distance below the surface of the water, this distance depending on the length and height of waves encountered at the location of anchoring, the support will remain practically at rest even with the greatest waves. If now a construction, for example an aircraft landing surface, projecting out of the water is rigidly mounted on this float, the construction would nevertheless take part in the wave motion in a reduced degree. An oscillation of the whole construction would occur about the float as stationary centre.

This oscillatory motion is reduced according to the invention in the following manner, reference being had to the drawing.

In the figures, 1 is the part of the structure, shown solely for example as a flat surface such as an aircraft landing stage, located above the water surface, which is rigidly connected with the float 3 by a supporting structure here indicated as a pillar 2; this float is connected with the sea bottom 7 in known manner by an anchor 5 and chain 6 so that the whole structure is held in place despite any currents and translatory movement thereby prevented. Since the forces involved are small the chain and anchor can be relatively light. To maintain horizontal riding of the float 3 it must be more heavily weighted on the opposite side to that at which the chain 6 is attached, for example by means of a second anchor and chain 10, 11, to preserve equilibrium.

Around the pillar 2 is a tubular upwardly diverging casing 4 conveniently of truncated conical form which by means of a ball joint or the like 9, preferably water tight, at the lower closed end of smallest diameter, can swing in all directions and move vertically with respect to the pillar 2 while enclosing an air space; 8 indicates the mean sea level, and $e$ the depth expressed in wave lengths.

The float 3 is so designed that the upthrust thereon carries in addition to its own weight, the part of pillar 2 between the lower end of casing 4 and float 3 less the upthrust on this part, the total weight of the remaining part of pillar 2, the weight of the support 1 and the weight of the chain 6 less the upthrust thereon, and when carrying this total weight rides at a depth corresponding to the permissible motion of the support calculated according to Rankine's rule. The conical casing furnished at the bottom with the sliding and swinging joint can by these means follow the motion of the waves and any up and down motion involved without this motion affecting the position of the members 1, 2 and 3.

The diameter of the casing 4 at the lower end is determined by the construction of the ball joint. The diameter at the mean surface level is equal to this diameter plus H, H being equal to $2\zeta$ which is the diameter of the particle orbit at the surface (maximum value $\frac{1}{10}$ wave length).

With wave motion, casing 4 oscillates, its maximum deviation being such as to bring one of its generating lines parallel with the post 2, it then swinging back (corresponding with the orbit) and bringing the opposite generating line parallel with the post 2. The smaller or greater upthrust on the structure 1, 2, 3 compared with the mean position, due to the increase or decrease of the length of post 2 exposed between the lower end of casing 4 and the float 3 can be neglected as it represents a very small fraction of the total necessary upthrust.

As therefore the casing 4 surrounding the actual support structure receives or rather partakes of the wave motion, it protects the main structure from all effects of the waves and the structure is held in a practically motionless position. With a depth of immersion of the float of $e=100$ metres, an assumed (and rare) wave length of 100 metres with a height of 10 metres ($=\frac{1}{10} e$) the float at a depth of 9/9 wave length would move at a distance of H/1024 i. e., less than 1 cm., from its position of rest. Accordingly practically stationary riding can be obtained even in storms in the open ocean.

If vertical mobility of the casing 4 with respect to the pillar 2 is dispensed with, the upper opening of the casing is located so high above the mean water level that the highest waves at its location cannot break into the casing.

It is pointed out that the whole system always rides in a stable manner since the metacentre is always over the centre of gravity of the whole structure.

It is also pointed out that upon float 3 there can be several rigid connecting structures 2 leading to the actual support member 1 as shown in Figure 2. It is further possible for several separate floats 3 to carry a single actual support 1 as shown in Figure 3.

What I claim is:—

1. A floating structure support for use in water comprising a float riding submerged in deep water substantially at rest, an actual support above the surface, a structure connecting said float and said support, and a casing surrounding said connecting structure, joined thereto in deep water substantially at rest in such a manner as to be movable with respect thereto.

2. A floating support structure for use in water comprising a float riding submerged in deep water substantially at rest, an actual support above the surface, a structure connecting said float and said support, and a casing containing air surrounding said connecting structure, making a water tight joint therewith in deep water substantially at rest in such a manner as to be movable with respect thereto.

3. A floating support structure for use in water comprising a float riding submerged in deep water substantially at rest, an actual support above the surface, a structure connecting said float and said support, and an upwardly diverging casing surrounding said connecting structure, joined thereto in deep water substantially at rest in such a manner as to be movable with respect thereto.

4. A floating support structure for use in water comprising a float riding submerged in deep water substantially at rest, an actual support above the surface, a structure connecting said float and said support, and an upwardly diverging casing open at its upper end surrounding said connecting structure with its upper end above the surface of the water and its lower end making a water tight joint with said connecting structure in deep water substantially at rest in such a manner that said casing is movable with respect to said structure.

5. A floating support structure for use in water comprising a float riding submerged in deep water substantially at rest, an actual support above the surface, a structure connecting said float and said support, and an inverted truncated conical casing surrounding said connecting structure making joint at its lower end therewith in deep water substantially at rest and having its upper end open and above the surface of the water and of diameter at the mean surface level at least equal to the maximum particle orbit expected at the location of the structure.

6. A floating support structure for use in water comprising a float riding submerged in deep water substantially at rest, an actual support above the surface, a structure connecting said float and said support, and a casing surrounding said connecting structure joined thereto in deep water substantially at rest in such a manner as to enable said casing to move vertically and swing with respect to said structure.

7. A floating support structure for use in water comprising a float riding submerged in deep water substantially at rest, an actual support above the surface, a structure connecting said float and said support, a casing surrounding said connecting structure, and a ball joint connecting said casing with said structure.

8. A floating support structure for use in water comprising a float riding submerged in deep water substantially at rest, an actual support above the surface, a structure connecting said float and said support, an open topped casing containing air surrounding said connecting structure with its upper end above the surface of the water, and a vertically slidable water tight ball joint connecting the lower end of said casing with said structure in deep water substantially at rest.

9. A support for use in open water comprising in combination a float, an actual support, a rigid structure connecting said support and said float, a hollow upwardly diverging open topped casing swingably jointed at its lower end to said rigid structure near said float, the dimensions of the parts being such that when placed in water the actual support and upper end of said casing are above the water surface and the float rides at a depth where the water is substantially at rest even with maximum waves to be expected at the locality of use.

10. A support for use in open water comprising in combination a float, an actual support, a rigid structure connecting said support and said float, a hollow upwardly diverging open topped casing surrounding said rigid structure, and a ball joint making a vertically slidable and swingable water tight joint between the lower end of said casing and said rigid structure near said float, the dimensions of the parts being such that when placed in water the actual support and upper end of said casing are above the water surface and the float rides at a depth where the water is substantially at rest even with maximum waves to be expected at the locality of use.

11. In a floating support for use in open water, the combination of an anchored float immersed to a depth at which the water is substantially at rest, a support above the water level carried by said float, and means protecting said support from the effect of wave motion above the float.

12. A floating support for use in water comprising floating means riding submerged in deep water substantially at rest, an actual support above the surface, a plurality of supporting structures connecting said floating means and said actual support, and a casing surrounding each said supporting structure joined thereto in deep water substantially at rest in such a manner as to be movable with respect thereto.

13. A floating support for use in water comprising a plurality of floats riding submerged in deep water substantially at rest, an actual support above the surface, a plurality of supporting structures connecting said floats and said actual support, and a casing surrounding each said supporting structure joined thereto in deep water substantially at rest in such a manner as to be movable with respect thereto.

14. A floating support for use in water comprising a plurality of floats riding submerged in deep water substantially at rest, an actual support above the surface, a supporting structure connecting each said float with said actual support, and a casing surrounding each said supporting structure joined thereto in deep water substantially at rest in such a manner as to be movable with respect thereto.

15. A floating support structure for use in water comprising a float riding submerged in deep water substantially at rest, an actual support above the surface, a structure connecting said float and said support, and an upwardly diverging casing open at its upper end surrounding said connecting structure with its upper end projecting above the surface by at least half the maximum wave height and its lower end making a water tight joint with said connecting structure in deep water substantially at rest in such a manner that said casing is movable with respect to said structure.

In testimony whereof I have signed my name to this specification.

MAX ALBERT HENKER.